United States Patent
Korkowski

(10) Patent No.: US 6,201,661 B1
(45) Date of Patent: Mar. 13, 2001

(54) DISC SLIP PREVENTING SPACER RING APPARATUS AND METHOD OF USE

(75) Inventor: Kurt James Korkowski, Hudson, WI (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/210,056

(22) Filed: Dec. 11, 1998

Related U.S. Application Data

(60) Provisional application No. 60/085,795, filed on May 18, 1998.

(51) Int. Cl.⁷ .................................................... G11B 17/02
(52) U.S. Cl. ............................................................ 360/98.08
(58) Field of Search ........................................... 360/98.08

(56) References Cited

U.S. PATENT DOCUMENTS

| | | | | |
|---|---|---|---|---|
| 4,819,105 | * | 4/1989 | Edwards .............................. | 360/98.08 |
| 4,945,432 | * | 7/1990 | Matsudaira et al. ............... | 360/98.02 |
| 5,006,942 | * | 4/1991 | Brooks et al. ....................... | 360/98.08 |
| 5,600,512 | * | 2/1997 | Radwam et al. .................... | 360/98.08 |

* cited by examiner

*Primary Examiner*—Robert S. Tupper
(74) *Attorney, Agent, or Firm*—Schwegman, Lundberg, Woessner & Kluth, P.A.

(57) ABSTRACT

An information handling system, such as a disc drive, includes a base, a disc stack rotatably attached to the base, and an actuator assembly movably attached to the base. The disc stack assembly includes a spindle hub rotatably coupled to the disc drive. The spindle hub includes a cylindrical portion as well as a flange on one end of the spindle hub. At least one disc and a disc spacer are clamped to the spindle hub. The disc spacer includes at least one disc contact surface. In some instances the disc spacer may have two disc contact surfaces. In the disc contact surface also has channel or groove therein. The channel or groove is annular and continuous so that no localized stress or a minimum amount of localized stress will be produced. The channel or groove is dimensioned so that a specific coefficient of friction is produced between the disc spacer ring and the surface of the disc. The disc contact surface may have more than one channel or groove therein. Assembling the disc stack includes placing the at least one disc moveably about the spindle hub and placing the disc spacer ring moveably about the spindle hub. The disc contact surface of the disc spacer ring which has the groove or channel therein is positioned so that it contacts the surface of the disc. The disc and disc spacer are then clamped to the spindle hub with a force sufficient to cause the surface of the disc to protrude into the groove of the disc spacer ring.

12 Claims, 7 Drawing Sheets

DISC SLIP PREVENTING SPACER RING APPARATUS AND METHOD OF USE

RELATED APPLICATION

This application claims the benefit of U.S. Provisional Application Ser. No. 60/085,795, filed May 18, 1998 under 35 USC119(e).

FIELD OF THE INVENTION

The present invention relates to the field of mass storage devices. More particularly, this invention relates to a disc spacer ring for use in a disc pack assembly for a disc drive.

BACKGROUND OF THE INVENTION

One of the key components of any computer system is a place to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

Information representative of data is stored on the surface of the memory disc. disc drive systems read and write information stored on tracks on memory discs. Transducers, in the form of read/write heads attached to the sliders, located on both sides of the memory disc, read and write information on the memory discs when the transducers are accurately positioned over one of the designated tracks on the surface of the memory disc. The transducer is also said to be moved to a target track. As the memory disc spins and the read/write head is accurately positioned above a target track, the read/write head can store data onto a track by writing information representative of data onto the memory disc. Similarly, reading data on a memory disc is accomplished by positioning the read/write head above a target track and reading the stored material on the memory disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

The transducer is typically housed within the slider. The slider is a small ceramic block which is passed over the disc in a transducing relationship with the disc. The small ceramic block, also referred to as a slider, is usually aerodynamically designed so that it flies over the disc. Most sliders have an air bearing surface ("ABS") which includes rails and a cavity between the rails. When the disc rotates, air is dragged between the rails and the disc surface causing pressure, which forces the head away from the disc. At the same time, the air rushing past the depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular fly height. The fly height is the thickness of the air lubrication film or the distance between the disc surface and the transducing head. This film eliminates the friction and resulting wear that would occur if the transducing head and disc were in mechanical contact during disc rotation. In some disc drives, the slider passes through a layer of lubricant rather than flying over the surface of the disc.

Disc drives include a disc stack which includes a spindle hub, one or more discs stacked on the hub and a clamp for attaching the discs to the spindle hub. Spacer rings are used to space each disc from adjacent discs or other components stacked on the spindle hub. The hub has a flange or lip which typically is located at one end of the spindle hub and contacts the surface of the first disc near the inner diameter of the disc. The disc spacer rings are generally considered part of the disc stack. The term disc stack applies to a disc drive having only one disc as well as to disc drives having more than one disc. The disc clamp provides a compressive load on the disc stack to hold the discs in place. The compressive load acts on the inner diameter of the disc or discs in the disc stack and is in a direction which is parallel to the axis of the hub. Many refer to this compressive load as an axial load since it acts in the axial direction. A spindle motor rotates the spindle hub and the disc stack. Some spindle motors are positioned entirely within the spindle hub.

Higher rotational speeds are used to increase performance of the disc drive. Higher rotational speeds also require that the disc in the disc drive have less mass as it is critical that the disc or discs spin up to a speed where the slider or small ceramic block is placed in transducing position with respect to the disc as soon as possible. Less mass is achieved by using thinner discs. In addition, thinner discs also allow for shorter disc stacks which are necessary for shorter form factor disc drives. The use of thinner discs with lower mass also enables the use of smaller spindle motors.

One problem associated with a disc stack using thinner discs is that when thinner discs are clamped they are more prone to cone or "potato chip". In other words, the discs may not be flat. To make the discs flat, a lower axial force may be used.

Lowering the axial load may produce another problem. Using a lower axial force lessens the friction force between the disc and the spacer or flange on the hub. When less friction force is present, discs that have been used to form a disc stack are more prone to shift from their original position when subjected to a radial force such as a shock load at the factory or during assembly into a computer or after the customer has received the disc drive. Movement between the disc and the rest of the stack produces many problems. The disc stack is out of balance and vibrates and causes noise. The unbalanced disc pack also stresses the bearings between the rotating portion of the hub and the spindle shaft. Stressed bearings have a shorter life which may be less than the stated life of the disc drive. Track following is difficult or next to impossible since the tracks are shifted from the position in which the original writing was performed. In other words, the tracks in a disc drive with a shifted disc are off center or nonconcentric with respect to the rest of the disc stack.

Any planar vibrations or vibrations which travel in the plane of the data surface of the disc make track following of the transducing head even more difficult. In other words, when the disc stack vibrates in a planar direction, the track to be followed will pass traserse to the tracking direction of the transducing head. The problem is magnified by the fact that the tracks are very closely spaced. In today's disc drives, track densities of 10,000 tracks per inch are common. Six tracks fit on a human hair. This problem will only get worse as time marches on since higher track densities are contemplated for the future.

Disc shift is also on the increase since more disc drives are subjected to shock loading which may result in disc shift. Portable or notebook computers now include disc drives. People drop these computers more than a stationary desktop computer. In addition, the lower axial forces also make disc shift more common from handling in during manufacture, shipping and distribution of the disc drives.

In the past, disc spacers have had essentially flat surfaces. These have worked until the axial loads used on flat disc spacers have dropped to prevent coning or other disc deformities. The friction force between the spacing ring and a disc surface is equal to the axial force multiplied by the coefficient of friction between the disc surface and the surface on the spacer. In other words, the friction force is directly proportional to axial clamping force being applied. Since axial clamping forces are being reduced, the friction force is also being reduced.

Thus, there is a need for a method and apparatus for use in a disc stack that produces a higher coefficient of friction between the spacer ring and the disc surface so that a higher friction force can be produced between the disc and the spacer for a given axial clamping force. The friction force would then be higher so that the disc or discs in the disc stack do not shift with respect to the hub. There is also a need for an apparatus that can be used in current methods for forming a disc stack. Furthermore, there is need for an apparatus that is easy to assemble and easy to manufacture. There is also a need for a apparatus which does not generate particles.

SUMMARY OF THE INVENTION

An information handling system, such as a disc drive, includes a base, a disc stack rotatably attached to the base, and an actuator assembly movably attached to the base. The disc stack assembly includes a spindle hub rotatably coupled to the disc drive. The spindle hub includes a cylindrical portion as well as a flange on one end of the spindle hub. At least one disc and a disc spacer are clamped to the spindle hub. The disc spacer includes at least one disc contact surface. In some instances the disc spacer may have two disc contact surfaces. In the disc contact surface also has channel or groove therein The channel or groove is annular and continuous so that no localized stress or a minimum amount of localized stress will be produced. The channel or groove is dimensioned so that a specific coefficient of friction is produced between the disc spacer ring and the surface of the disc. The disc contact surface may have more than one channel or groove therein. Assembling the disc stack includes placing the at least one disc moveably about the spindle hub and placing the disc spacer ring moveably about the spindle hub. The disc contact surface of the disc spacer ring which has the groove or channel therein is positioned so that it contacts the surface of the disc. The disc and disc spacer are then clamped to the spindle hub with a force sufficient to cause the surface of the disc to protrude into the groove of the disc spacer ring.

Advantageously, the disc spacer ring with the annular channel produces a higher coefficient of friction between the spacer ring and the disc surface so that a higher friction force is produced between the disc and the spacer for a given axial clamping force. The higher friction force prevents shifting of the disc in the in the disc stack and more specifically prevents shifting of the disc or discs with respect to the hub. The apparatus is easy to use. This eases assembly and eases the manufacturing process since no different manufacturing methods need be employed. The method also generates minimal particles. The spacer ring also provides a continuous annular channel so that there are no localized stresses on the disc which would cause deformation.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced It is to be understood that other embodiments may be utilized and structural changes may be made without departing from the scope of the present invention.

Figure 1:
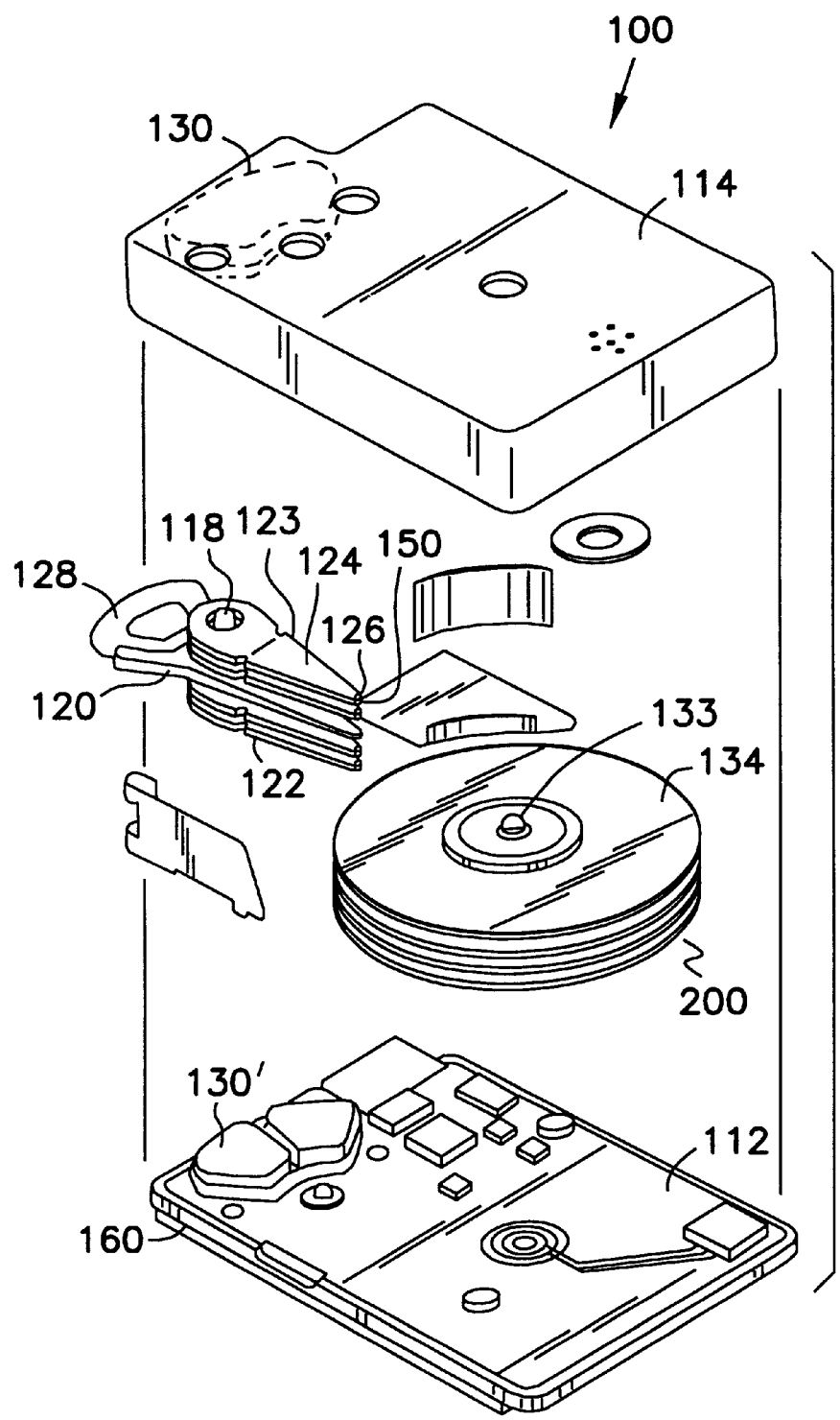
FIG. 1 is an exploded view of a disc drive with a multiple disc stack and a ramp assembly for loading and unloading transducers to and from the surfaces of the discs.

The invention described in this application is useful with all mechanical configurations of disc drives having either rotary or linear actuation. In addition, the invention is also useful in all types of disc drives including hard disc drives, zip drives, floppy disc drives and any other types of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a pair of magnets 130. The pair of magnets 130, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc.

Figure 2:
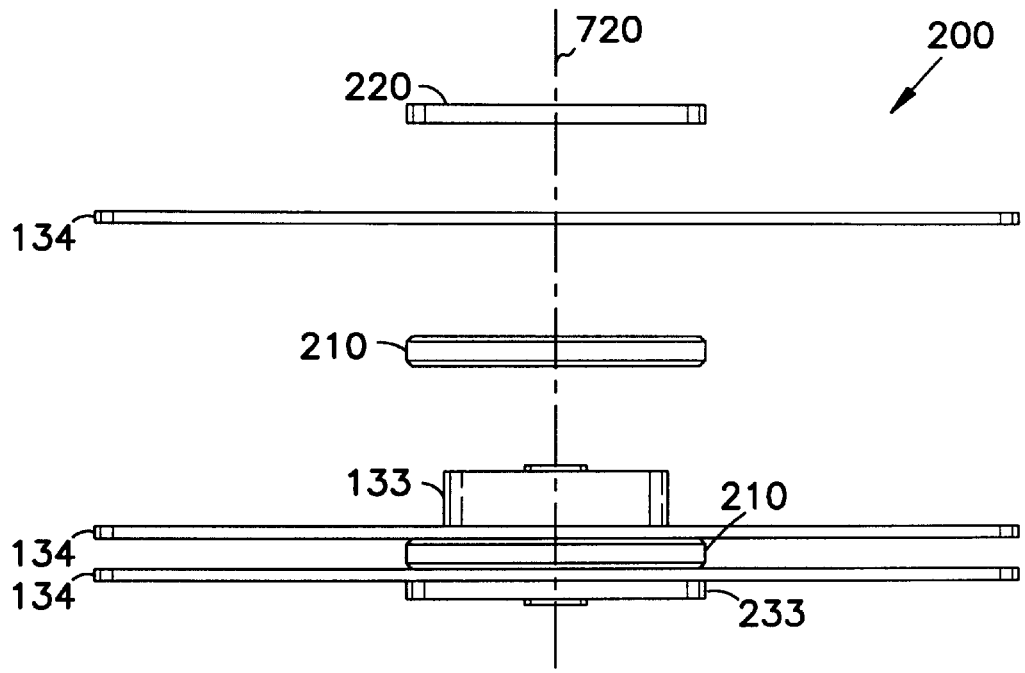
FIG. 2 is a side view of a spindle hub with a plurality of attached discs and a plurality of disc spacers which form a disc stack assembly.

FIG. 2 is a side view of a spindle hub 133 with a plurality of attached discs 134 and a plurality of disc spacers 210 which form a disc stack assembly 200. The disc stack assembly 200 also includes a disc clamp 220 which attaches the discs 134 and the spacers 210 to the hub 133. The hub 133 includes a mounting flange 233. Initially a disc 134 is placed on the mounting flange 233. Thereafter, spacers 210 and discs 134 are alternately placed onto the spindle hub 133. Once a selected number of discs are placed on the spindle hub 133, the disc clamp is used to place an axial load onto the discs and disc spacers as well as to attach to the spindle hub 133. In this particular embodiment the disc clamp 220 is a heat-shrink type disc clamp. In other words, the disc clamp 220 is heated so that it's inner diameter is larger than the outer diameter of the spindle hub 133. The heated disc clamp 220 is then positioned over the hub 133 and an axial force is applied to the disc clamp 220. The disc clamp is held in place with the axial force applied as it cools. The cooling of the disc clamp causes the inner diameter of the disc clamp to shrink so that it attaches or grips the hub 133.

Figure 3:
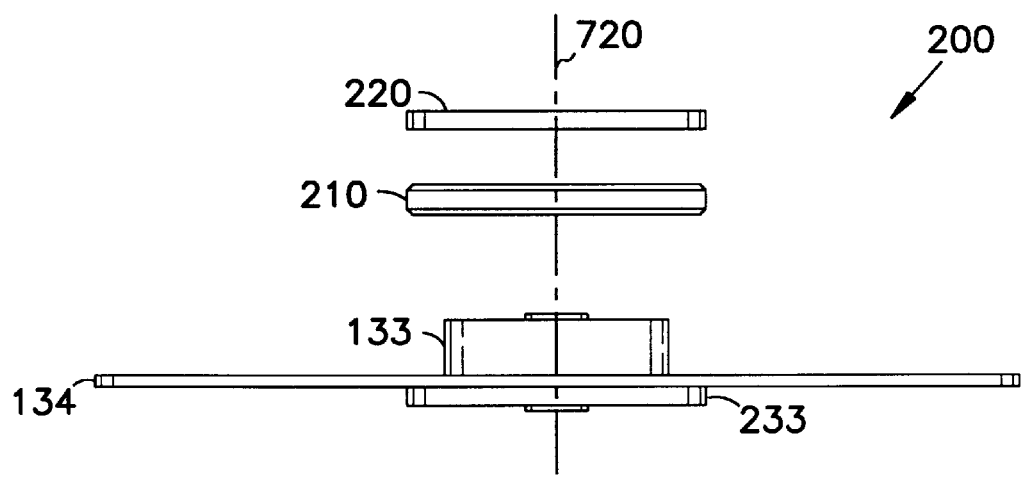
FIG. 3 is a side view of a spindle hub with a single attached disc and a disc spacer which forms a disc stack assembly.

FIG. 3 is a side view of a spindle hub 133 with a single disc 134 and a single disc spacer 210 attached to the hub 133. The disc stack assembly 200 shown in FIG. 3 illustrates that the spacer 210 can be used in a disc drive design with a single disc 134. The disc 134 is placed onto the hub 133 and against the mounting flange 233 of the hub 133. Then the spacer 210 is positioned over the disc 134 and around the hub 133. a heat shrink clamp 220 is then used to hold the disc 134 and disc clamp 210 to the hub, as well as to apply an axial force to the disc clamp 210 and the hub 133.

Figure 4:
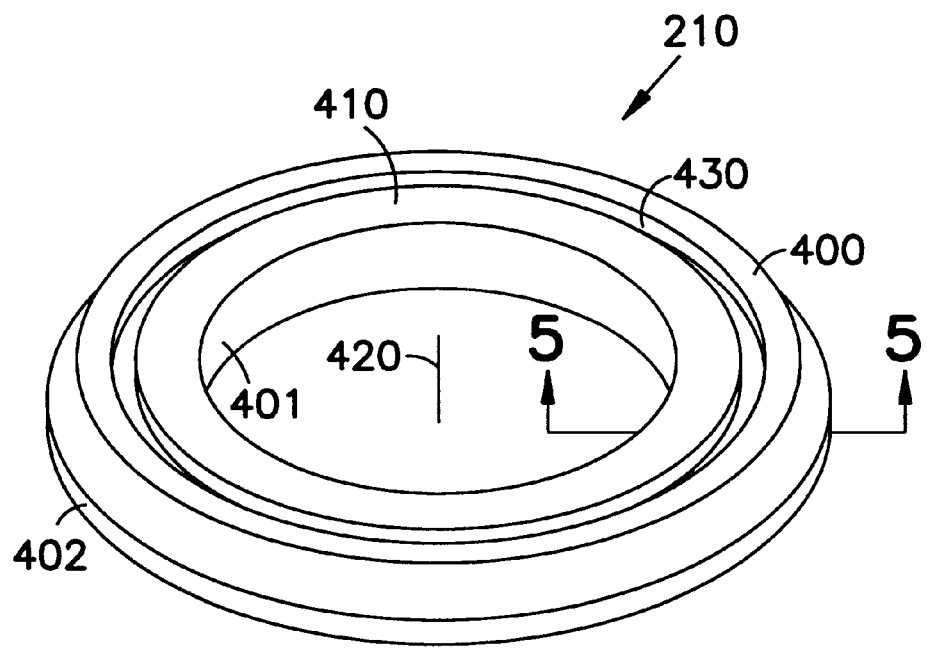
FIG. 4 is a perspective view of a disc spacer ring.
Figure 5:
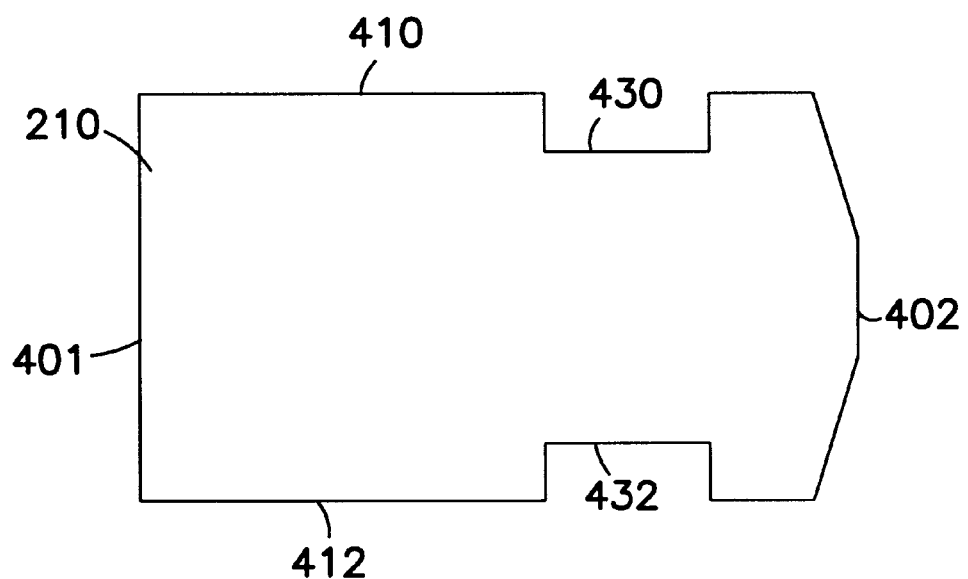
FIG. 5 is a cross sectional view of the disc spacer ring shown in FIG. 4 along line 5—5 in FIG. 4.

FIG. 4 is a perspective view of the disc spacer ring 210 used in the disc stacks formed in either FIG. 2 or FIG. 3. The disc spacer 210 includes an annular main body 400 which has an axial center line 420, an inner diameter 401, and an outer diameter 402. The annular main body 400 includes a first contact surface 410 and a second contact surface 412 (shown in FIG. 5). When either of the first contact surface 410 or the second contact surface 412 contacts the surface of the disc in a disc stack, these surfaces are then referred to as disc contact surfaces. Positioned within the first contact surface 410 is a first annular channel or groove 430. Positioned within the second contact surface 412 is a second annular channel or groove 432. The second contact surface 412 and the second annular channel or groove 432 is not shown in FIG. 4 but is best seen in FIG. 5. The channels 430 and 432 are continuous annular channels or grooves positioned between the inner diameter 401 and the outer diameter 402 of the disc spacer 210. The continuous groove or channel positioned between the inner diameter 401 and the outer diameter 402 of the disc spacer 210 minimizes or substantially eliminates localized stress produced by the disc spacer 210 contacting the disc 134. The position and size of the annular groove or channel 430, 432 will vary dependent upon the coefficient of friction sought between the disc spacer 210 and the surface of the disc 134.

FIG. 5 shows a cross section of the clamp ring 210 shown in FIG. 4 along line 5—5. As shown, each annular groove or channel 430, 432 is formed with very sharp corners to increase the coefficient of friction between the disc contact surface 410, 412 of spacer ring 210 and the respective surface of the disc 134 or discs. The cross sectional shape of the annular grooves or channels 430, 432 in the disc spacer ring 210 are substantially square or rectangular.

It is contemplated that the disc spacer may also have multiple channels in one particular disc contact surface 430, 432 to further increase the coefficient of friction between the disc spacer 210 and the surface of the disc 134. It is further contemplated that one disc contact surface 410 may have a different type of groove than the other disc contact surface 412. This type of spacer ring 210 may have one contact surface 410 in contact with the flange 233 on the hub 133 and another contact surface 412 in contact with the disc 134. The flange 233 on the hub 133 is made of a different material than the disc 134.

Figure 6:
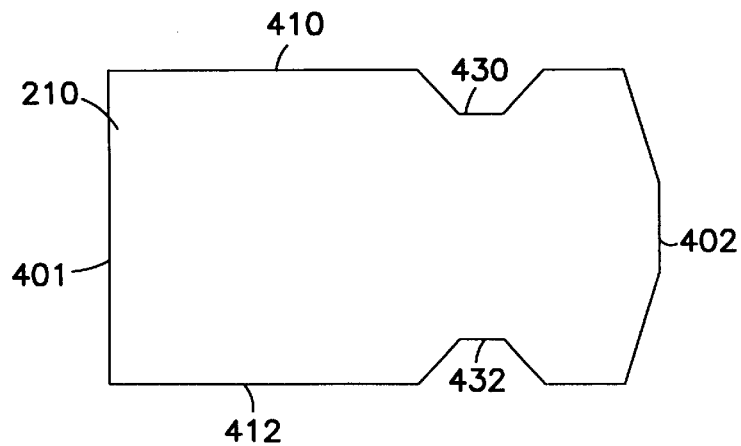
FIG. 6 is a cross sectional view of another preferred embodiment of the disc spacer ring having a channel with a trapezoidally shaped cross section.
Figure 7:
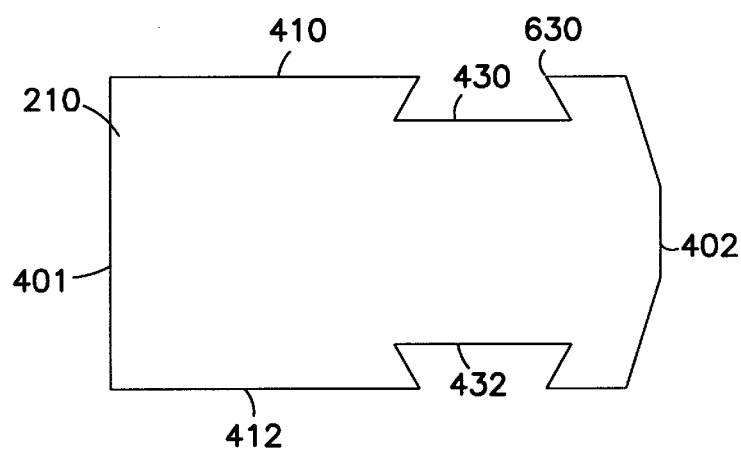
FIG. 7 is a cross sectional view of another preferred embodiment of the disc spacer ring having a channel with a trapezoidally shaped cross section.
Figure 8:
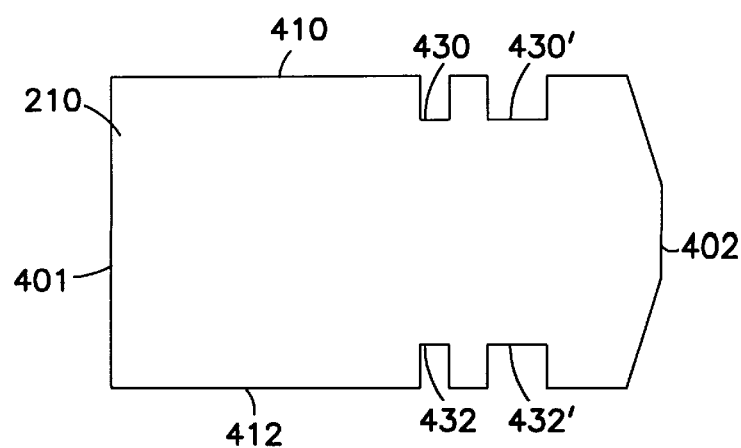
FIG. 8 is a cross sectional view of another preferred embodiment of the disc spacer ring having a plurality of channels on a single disc contact surface.
Figure 9:
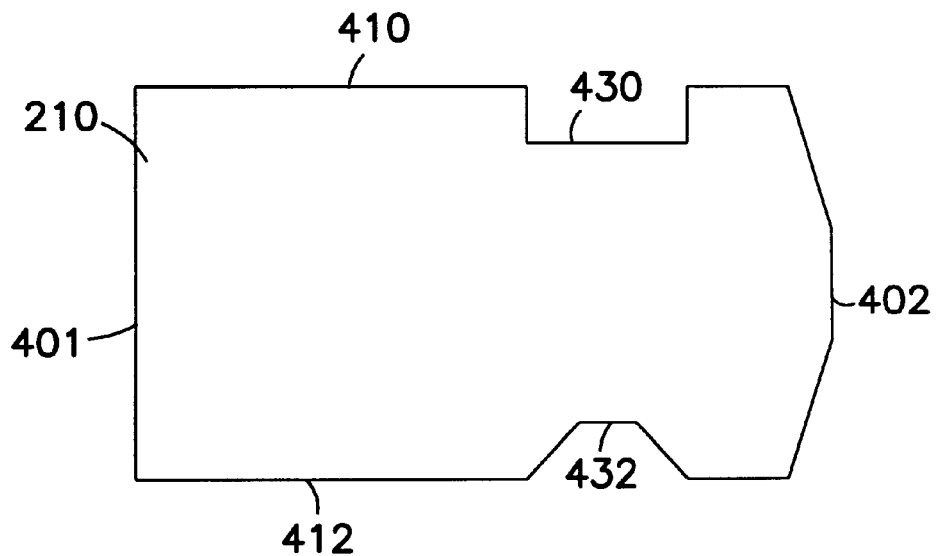
FIG. 9 is a cross sectional view of another preferred embodiment of the disc spacer ring having a first channel with a first cross section and having a second channel with a second cross section, said first cross section being different than the second corss section.

FIGS. 6–9 show cross sections of various disc spacer rings 210 that have different configurations of grooves or channels. FIG. 6 shows a disc spacer 210 where the grooves or channels 430 and 432 are formed so that the cross-section of the groove or channel 430, 432 is trapezoidally shaped. The angle between the wall of the groove or channel 430, 432 provides for a more gentle transition to the channel or groove 430,432. FIG. 7 shows a disc spacer 210 having channels 430 and 432 which are also trapezoidally shaped. In this particular embodiment, the channels 430 and 432 are at an angle which is more severe than the previous embodiments shown. In other words, the edge of the channel, 430, depicted by the reference numeral 630, is sharp and my bite into the surface of a disc (not shown). FIG. 8 shows a spacer ring 210 having a plurality of channels 430 and 430' associated with disc contact surface 410 and a plurality of channels 432 and 432' associated with disc contact surface 412. It should be noted that any number of channels may be associated with a particular disc contact surface 410, 412. FIG. 9 shows a disc spacer 210 having a first channel 430 and a second channel 432. The first channel 430 has a different cross sectional shape than the second channel 432. Such a disc spacer ring 210 may be used where one contact surface 412 contacts a first surface, such as a disc, and the other contact surface 410 contacts another surface such as the flange 233 of the hub 133. The channel 430 with the sharper corners may be used on the material which has a naturally lower coefficient of friction between the first material and the contact surface 410. In other words, the sharp edge of the channel 430 may be used to equalize the coefficient of friction between the disc contact surface 410 and the surface to which it mates, so that the coefficient of friction between the disc contact surface 412 and the surface to which it mates is substantially equal.

Figure 10:
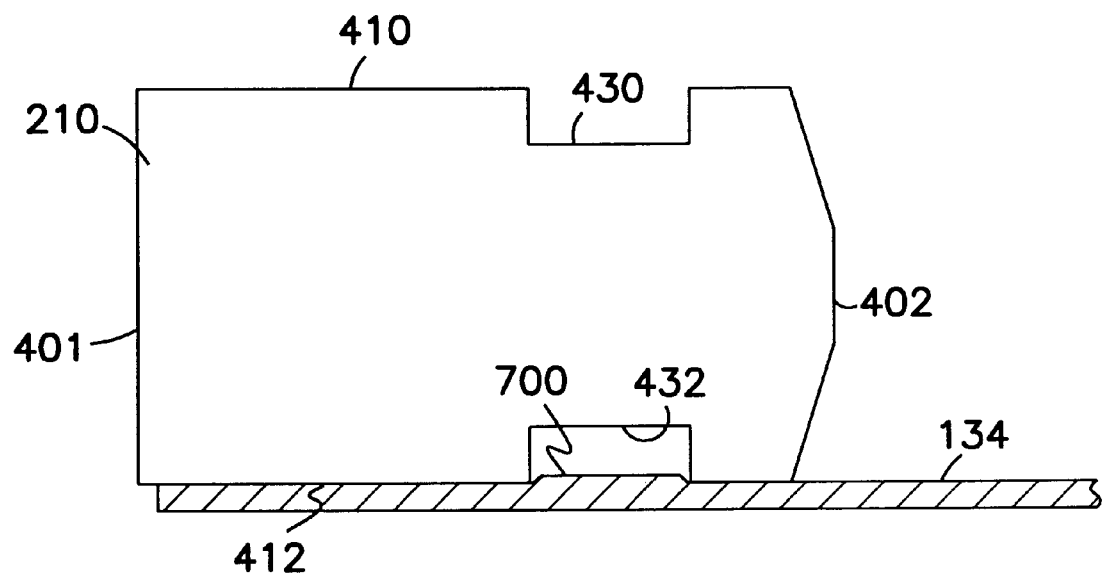
FIG. 10 is a cross sectional view of a portion of the disc surface protruding into a channel or groove on the disc spacer.

FIG. 10 is a cross sectional view of a portion of a disc 134 having a surface portion which protrudes into the channel 432 of the disc spacer 210. disc 134 has a protrusion 700 which extends into the channel 432. The protrusion 700 is shown in an exaggerated form to illustrate how the channel 432 increases the coefficient of friction between the disc contact surface 412 and the surface of the disc 134. When the disc 134 is sandwiched between two spacer rings 210 or between a spacer ring 210 and another surface, such as the flange 233 of the hub 133, the channel 432 provides a relief in which the disc surface and magnetic layers of the disc 134 deform to create the protrusion 700. Since the protrusion 700 extends into the relief or channel 432, when radially acting forces are encountered, not only do the surface-to-surface bonds have to be broken for the discs to shift or slip, but also a mechanical interface due to the surface of the disc 134 protruding into the channel 432 or groove must also be overcome. As a result of adding the mechanical interface, which includes the protrusion 700 into the channel 432, the effective coefficient of friction is increased. The amount of the increase can be altered by the shape of the channel. For example, when a channel having walls which slope gently into the channel is used, the mechanical interface or protrusion is more easily overcome and therefore this lowers the coefficient of friction between the surface of the disc 134 and the disc contact surface 412. The angle of the channel wall 432 can be varied to produce differing coefficients of friction. It should be noted that when the disc 134 is sandwiched between two spacer rings, the spacer ring protrudes or forms a protrusion 700 into the channels 432 of the first spacer ring and into a channel 430 of a second spacer ring. The same effect will happen along each of the contact surfaces 410 and 412 of the various disc spacers 210 used to form the disc stack assembly.

Figure 11:
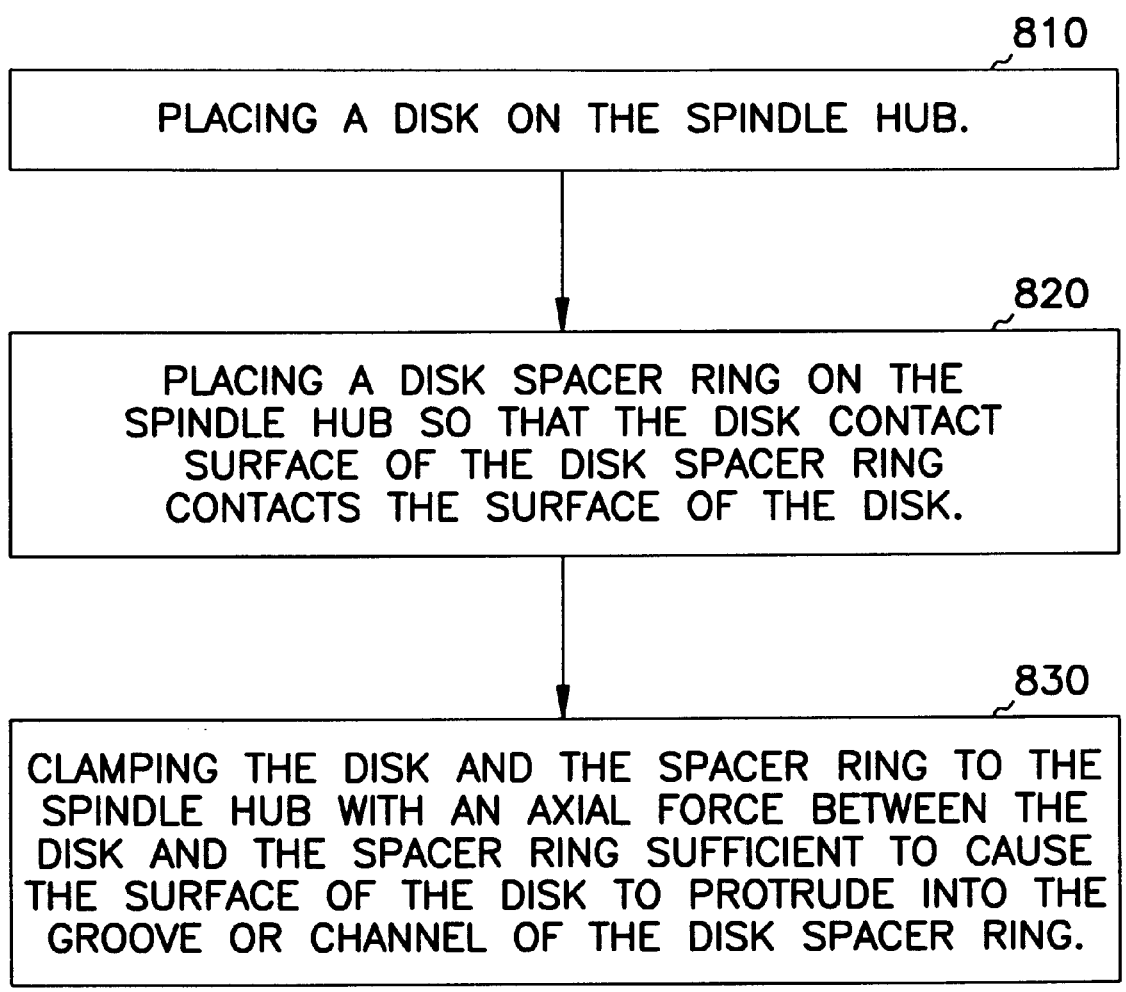
FIG. 11 is a flow chart for assembling the disc stack using the disc spacer ring.

FIG. 11 is a flow chart for assembling the disc stack using the disc spacer ring 210. As depicted by reference numeral 800, a disc 134 is placed onto the spindle hub 133. Typically, the disc 134 is capable of moving with respect to the spindle hub 133. The disc typically rests on the flange 233 of the spindle hub 133. As depicted by reference numeral 810, a disc spacer ring 210 is then placed on the spindle hub 133. The spacer ring 210 is placed so that the disc contact surface 410 or 412 is in contact with the surface of the disc 134. In a disc stack assembly 200 which has a single disc, the placement of disc spacers 210 and discs 134 is complete at this juncture. In a disc stack assembly 200 which has multiple discs 134, such as shown in FIG. 2, discs and spacers will be alternately placed onto the hub until the desired number of discs are on the hub 133. Once the desired number of discs are on the hub, the disc 134 and the spacer ring 210 are clamped to the spindle hub 133, as depicted by reference numeral 830. An axio-clamping force is applied to the clamp. The clamping force is sufficient to cause the surface of the disc to protrude into the groove or channel 430 or 432 of the disc spacer 210. The axial load or force results in a series of protrusions 700 into the grooves or channels 430, 432 associated with the particular disc surfaces to which the channels 430 and 432 mate. There are, of course, many ways to clamp the discs 134 and spacers 210 to the spindle hub 133. In the preferred embodiment, the clamp ring 220 is heated until its inner diameter allows it to fit over the spindle hub 133. The heated clamp 220 is then loaded with the force which produces the protrusions 700 at the various grooves 430,432 associated with the disc spacers 210. The clamp 220 is held in position as the clamp ring cools, until it shrink fits onto the spindle hub 133. As the clamp 220 cools, the load on the clamp 220 is maintained. In some instances, the disc stack 200 must be balanced before the discs 134 and spacers 210 are clamped to the hub 133.

Advantageously, the disc spacer ring with the annular channel produces a higher coefficient of friction between the spacer ring and the disc surface so that a higher friction force is produced between the disc and the spacer for a given axial clamping force. The higher friction force prevents shifting of the disc in the in the disc stack and more specifically prevents shifting of the disc or discs with respect to the hub. The apparatus is easy to use. This eases assembly and eases the manufacturing process since no different manufacturing methods need be employed. The method also generates minimal particles. The spacer ring also provides a continuous annular channel so that there are no localized stresses on the disc which would cause deformation of the disc.

Figure 12:
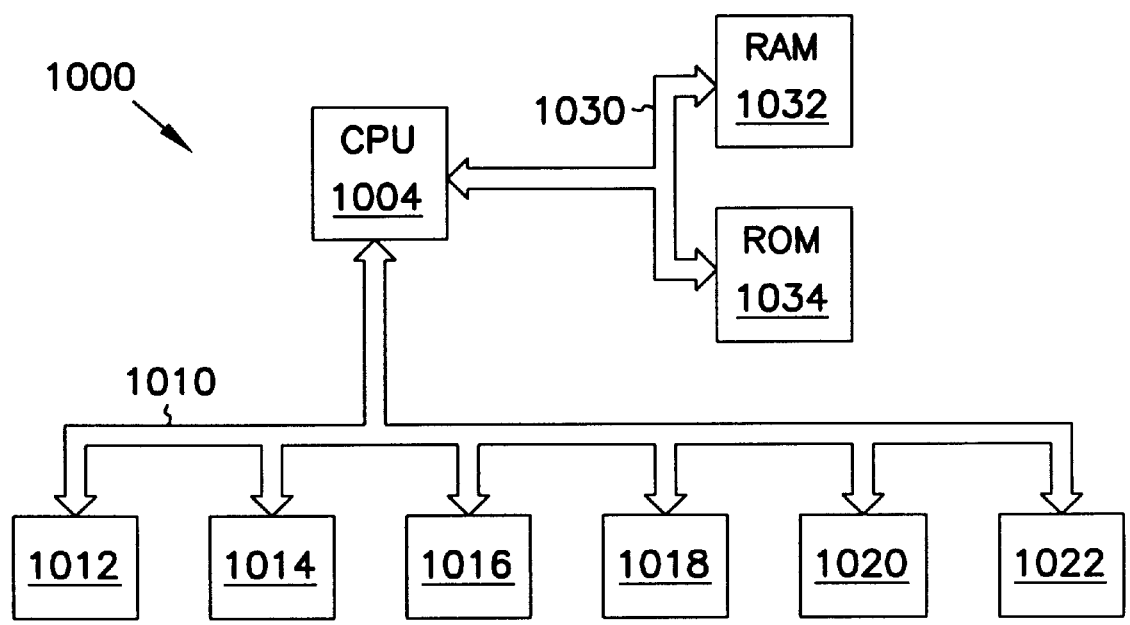
FIG. 12 is a schematic view of a computer system.

FIG. 12 is a schematic view of a computer system. Advantageously, the invention is well-suited for use in a computer system 1000. The computer system 1000 may also be called an electronic system or an information handling system and includes a central processing unit, a memory and a system bus. The information handling system includes a central processing unit 1004, a random access memory 1032, and a system bus 1030 for communicatively coupling the central processing unit 1004 and the random access memory 1032. The information handling system 1002 includes a disc drive device which includes the ramp described above. The information handling system 1002 may also include an input/output bus 1010 and several devices peripheral devices, such as 1012, 1014, 1016, 1018, 1020, and 1022 may be attached to the input output bus 1010. Peripheral devices may include hard disc drives, magneto optical drives, floppy disc drives, monitors, keyboards and other such peripherals. Any type of disc drive may have the disc spacer ring with the channeled clamping surface which will increase the coefficient of friction between the disc surface and the spacer ring while controlling or preventing disc distortion when being assembled into a disc stack. Furthermore, any type of disc drive may use the channeled disc spacer ring to increase the friction force between the disc spacer ring 210 and the disc 134.

In conclusion, a disc stack assembly 200 for use in a disc drive 100 includes a spindle hub 133 operatively configured to rotatably couple to the disc drive 100 to provide an axis about which the disc stack assembly 133 rotates. The spindle hub 133 includes a substantially cylindrical portion. A disc 134 is positioned on the spindle hub 133. An annular disc spacer 210 includes a structure for increasing the coefficient of friction between the annular disc spacer 210 and the surface of the disc 134. A clamp 220 for coupling the disc 134 and disc spacer 210 to the spindle hub 133. The structure of the annular disc spacer 210 includes a disc contact surface 410, 412 having a channel 430, 432 therein. The disc spacer 210 includes an inner diameter and an outer diameter. The channel 430, 432 in the disc spacer is annular and positioned between the inner diameter of the disc spacer 210 and the outer diameter of the disc spacer 21 0. The disc 134 includes a disc surface. The clamp 220 applies an axial load to the disc spacer 210 such that the disc surface protrudes into the channel 430, 432 of the disc spacer 210. The disc spacer 210 may include a first disc contact surface 410 having a first channel 430 therein and a second disc contact surface 412 having a second channel 432 therein. The first channel 430 has a substantially square shaped cross section. The second channel 432 also may have a substantially square shaped cross section. The first channel 430 may have a substantially trapeziodally shaped cross section and the second channel 432 may also have a substantially trapeziodally shaped cross section. The first disc contact surface 410 also may have a plurality of channels 430, 430' therein. The first disc channel has a first cross section and the second channel has a second cross section. The first channel 430 cross section may be different than the second channel 432 cross section. The channel is dimensioned and shaped to produce a selected coefficient of friction between the disc 134 and the annular disc spacer 210. The disc contact surface 410 may be substantially flat.

A disc drive 100 includes a disc stack assembly 200. The disc stack assembly 200 is rotated within the disc drive 100. The disc stack assembly 200 includes a base 112. A spindle hub 133 is rotatably coupled to the base 112 of the disc drive 100. The spindle hub rotates about an axis. The spindle hub 133 includes a substantially cylindrical portion. A disc 134 having an opening therein is positioned on the spindle hub 133. An annular disc spacer 210 having at least one disc contact surface 410 includes an annular channel 430 therein for increasing the coefficient of friction between the annular disc spacer 210 and the surface of the disc 234. A clamp 220 couples the disc 134 and disc spacer 210 to the hub 133. The annular channel 430 is a continuous annular channel positioned between an inner diameter and an outer diameter of the disc spacer 210. The clamp 220 places an axial load onto the spindle hub 133 of the disc drive 100 which acts through the disc spacer 210 to place a load substantially perpendicular to the surface of the disc 134. The axial load is sufficient to cause a portion of the surface of the disc 134 to protrude into the channel. The contact surface 410 may include another annular channel 430'.

A method of assembling a disc stack 200 with a spindle hub 133, at least one disc 134, and a disc spacer ring 210 is also discussed. The disc contact surface 410 for contacting the surface of the at least one disc 134 has a groove 430 therein. The method comprises the steps of placing the at least one disc 134 moveably about the spindle hub 133, and placing the disc spacer ring 210 moveably about the spindle hub 133 so that the disc contact surface 410 of the disc spacer ring 210 contacts the surface of the disc, and clamping the at least one disc 134 and the spacer ring 210 to the spindle hub 133. Clamping produces a force between the at least one disc 134 and the spacer ring 210 having a component acting substantially perpendicular to the surface of the disc 134. The force is sufficient to cause the surface of the disc to protrude into the groove 430 of the disc spacer ring 210. The method may further include the steps of heating a clamp ring 220 until it fits over the spindle hub 133, and loading the clamp 220 with the force, and holding the clamp ring 220 in position while the clamp ring 220 cools until it shrink fits onto the spindle hub 133.

A disc stack assembly 200 includes a spindle hub 133 rotatably coupled to the disc drive 100 for providing an axis about which the disc stack assembly 200 rotates. The spinle hub133 includes a substantially cylindrical portion. A disc is positioned on the spindle hub 133. An annular disc spacer 210 has means for increasing the coefficient of friction between the annular disc spacer 210 and the surface of the disc. A clamp for couples the disc 134 and disc spacer 133 to the spindle hub 133.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A disc stack assembly for use in a disc drive comprising:
   a spindle hub operatively configured to rotatable couple to the disc drive which provides an axis about which the disc stack assembly rotates, the spindle hub including a substantially cylindrical portion;
   a disc positioned on the spindle hub;
   an annular disc spacer further comprising a first disc contact surface having a first annular channel therein and, a second disc contact surface having a second annular channel therein; and
   a clamp which provides an adhesiveless coupling of the disc and disc spacer to the spindle hub, wherein the disc spacer includes an inner diameter and an outer diameter, the first channel in the disc spacer being annular and having a first cross sectional shape, said first channel positioned between the inner diameter of the disc spacer and the outer diameter of the disc spacer, the second channel in the disc spacer being annular and having a second cross sectional shape different than the first cross sectional shape, said first channel positioned between the inner diameter of the disc spacer and the outer diameter of the disc spacer.

2. A disc stack assembly for use in a disc drive comprising:
   a spindle hub operatively configured to rotatable couple to the disc drive which provides an axis about which the disc stack assembly rotates, the spindle hub including a substantially cylindrical portion;
   a disc positioned on the spindle hub;
   an annular disc spacer further comprising a first disc contact surface having a first annular channel therein and, a second disc contact surface having a second annular channel therein; and
   a clamp which provides an adhesiveless coupling of the disc and disc spacer to the spindle hub, wherein the disc includes a disc surface, the clamp applying an axial load to the disc spacer such that the disc surface protrudes into the first channel of the disc spacer and into the second channel of the disc spacer.

3. A disc stack assembly for use in a disc drive comprising:
   a spindle hub operatively configured to rotatable couple to the disc drive which provides an axis about which the disc stack assembly rotates, the spindle hub including a substantially cylindrical portion;
   a disc positioned on the spindle hub;
   an annular disc spacer further comprising:
     a first disc contact surface having a first annular channel and a third annular channel therein; and
     a second disc contact surface having a second annular channel therein; and
   a clamp which provides an adhesiveless coupling of the disc and disc spacer to the spindle hub, wherein the first channel has a substantially square shaped cross section and wherein the third channel has a substantially square shaped cross section.

4. The disc stack assembly for use in a disc drive of claim 3 wherein the second disc contact surface has a fourth annular channel therein.

5. A disc stack assembly for use in a disc drive comprising:
- a spindle hub operatively configured to rotatable couple to the disc drive which provides an axis about which the disc stack assembly rotates, the spindle hub including a substantially cylindrical portion;
- a disc positioned on the spindle hub;
- an annular disc spacer further comprising:
    - a first disc contact surface having a first annular channel therein; and
    - a second disc contact surface having a second annular channel therein; and
- a clamp which provides an adhesiveless coupling of the disc and disc spacer to the spindle hub, wherein one of the first or second disc contact surfaces has a plurality of annular channels therein, wherein the plurality of annular channels in one of the first or the second disc contact surfaces have different shapes in cross section.

6. A disc drive including a disc stack assembly for use in the disc drive, said disc stack assembly rotated within the disc drive, the disc drive comprising:
- a base;
- a spindle hub operatively configured to rotatably couple to the base of the disc drive which provides an axis about which the disc stack assembly rotates, the spindle hub including a substantially cylindrical portion;
- a disc having an opening therein and positioned on the spindle hub;
- an annular disc spacer having at least one disc contact surface having an annular channel therein; and
- a clamp which couples the disc and disc spacer to the spindle hub to place an axial load onto the spindle hub of the disc drive through the disc spacer to place a load substantially perpendicular to a surface of the disc, the clamping force sufficient to produce an axial load causing the surface of the disc to protrude into the channel.

7. The disc drive of claim 6 wherein the annular channel is a continuous annular channel positioned between an inner diameter and an outer diameter of the annular disc spacer.

8. The disc drive of claim 7 wherein the at least one disc contact surface has a plurality of annular channels therein.

9. The disc drive of claim 7 wherein the disc spacer has a first disc contact surface and a second disc contact surface, each of the first disc contact surface and the second disc contact surface including an annular channel therein.

10. A method of assembling a disc stack having a spindle hub, at least one disc, and a disc spacer ring with a disc contact surface for contacting a surface of the at least one disc, the disc contact surface having a groove therein, said method comprising the steps of:
   (a) placing the at least one disc moveably about the spindle hub;
   (b) placing the disc spacer ring moveably about the spindle hub, said disc contact surface of the disc spacer ring contacting the surface of the disc; and
   (c) clamping the at least one disc and the spacer ring to the spindle hub wherein clamping produces a force between the at least one disc and the spacer ring having a component acting substantially perpendicular to the surface of the disc, to produce a force sufficient to cause the surface of the disc to protrude into the groove of the disc spacer ring.

11. The method of claim 10 wherein the clamping step (c) further comprises the steps of:
   (c)(i) heating a clamp ring until it fits over the spindle hub;
   (c)(ii) loading the clamp with the force; and
   (c)(iii) holding the clamp ring in position while the clamp ring cools until the clamp ring shrinks onto the spindle hub.

12. A disc stack assembly for use in a disc drive, said disc stack assembly rotated within the disc drive, the disc stack assembly comprising:
- spindle hub rotatably coupled to the disc drive for providing an axis about which the disc stack assembly rotates, said hub including a substantially cylindrical portion;
- a disc positioned on the spindle hub;
- an annular disc spacer having means for increasing the coefficient of friction between the annular disc spacer and the surface of the disc; and
- a clamp for coupling the disc and disc spacer to the hub.

* * * * *

UNITED STATES PATENT AND TRADEMARK OFFICE
CERTIFICATE OF CORRECTION

PATENT NO. : 6,201,661 B1
DATED : March 13, 2001
INVENTOR(S) : Korkowski

It is certified that error appears in the above-identified patent and that said Letters Patent is hereby corrected as shown below:

Column 10, claim 1,
Line 11, delete "rotatable" and insert -- rotatably --.

Column 10, claim 2,
Line 35, delete "rotatable" and insert -- rotatably --.

Column 10, claim 3,
Line 52, delete "rotatable" and insert -- rotatably --.

Column 11, claim 5,
Line 6, delete "rotatable" and insert -- rotatably --.

Signed and Sealed this

Fifth Day of March, 2002

Attest:

Attesting Officer

JAMES E. ROGAN
Director of the United States Patent and Trademark Office